United States Patent
Jarvenkyla

(10) Patent No.: US 7,059,468 B2
(45) Date of Patent: Jun. 13, 2006

(54) PRODUCTION LINE FOR FOOD PRODUCTS

(76) Inventor: Mikael Jarvenkyla, Helteentie 10D, Mantsala (FI) FIN-04600

( * ) Notice: Subject to any disclaimer, the term of this patent is extended or adjusted under 35 U.S.C. 154(b) by 324 days.

(21) Appl. No.: 10/381,242

(22) PCT Filed: Sep. 24, 2001

(86) PCT No.: PCT/FI01/00833

§ 371 (c)(1),
(2), (4) Date: Sep. 3, 2003

(87) PCT Pub. No.: WO02/24555

PCT Pub. Date: Mar. 28, 2002

(65) Prior Publication Data
US 2004/0025712 A1    Feb. 12, 2004

(30) Foreign Application Priority Data

Sep. 22, 2000 (FI) .................................. 20002098
Sep. 22, 2000 (FI) .................................. 20002099

(51) Int. Cl.
*B65G 47/52* (2006.01)
*B65G 21/06* (2006.01)

(52) U.S. Cl. ................. 198/867.01; 198/583; 198/813; 198/860.2; 198/861.1; 198/867.14

(58) Field of Classification Search .......... 198/867.01, 198/867.14, 867.13, 813, 836.1, 860.2, 861.1, 198/465.2, 474.1, 583

See application file for complete search history.

(56) References Cited

U.S. PATENT DOCUMENTS

| | | | |
|---|---|---|---|
| 4,146,126 A * | 3/1979 | Mattos | |
| 5,409,343 A * | 4/1995 | Friedrich | 414/141.1 |
| 5,657,529 A * | 8/1997 | Bohn et al. | |
| 5,884,749 A * | 3/1999 | Goodman | 198/419.3 |
| 5,918,729 A * | 7/1999 | Chang | 198/810.04 |
| 5,988,364 A * | 11/1999 | Boyce et al. | 198/867.15 |
| 6,176,370 B1 * | 1/2001 | Davies | 198/867.15 |
| 6,223,886 B1 * | 5/2001 | Bonora et al. | 198/465.2 |
| 6,386,356 B1 * | 5/2002 | Eberle | 198/867.01 |
| 6,494,308 B1 * | 12/2002 | Bonora et al. | 198/465.2 |
| 6,520,312 B1 * | 2/2003 | Jager | 198/346.1 |
| 6,533,101 B1 * | 3/2003 | Bonora et al. | 198/465.1 |
| 6,889,816 B1 * | 5/2005 | Willing | 198/465.2 |

FOREIGN PATENT DOCUMENTS

FR    2678484    * 1/1993

* cited by examiner

*Primary Examiner*—Douglas Hess
(74) *Attorney, Agent, or Firm*—Young & Thompson

(57) ABSTRACT

A production line for food products includes a plurality of apparatus modules (1) arranged one after the other, each module being arranged to perform at least one manufacturing stage of the food product. The production line includes a frame (2), which includes driving elements (3) for driving at least one apparatus module (1). At least one movable apparatus module (1) can be adapted to the driving elements (3) in the frame (2) such that the apparatus module (1) can be driven by the driving elements (1) in the frame (2).

20 Claims, 3 Drawing Sheets

PRODUCTION LINE FOR FOOD PRODUCTS

BACKGROUND OF THE INVENTION

The invention relates to a production line for food products comprising a plurality of apparatus modules arranged one after the other each module being arranged to perform at least one manufacturing stage of the food product.

In this connection, the production line for food products refers to a bakery production line, for instance.

On a production line of this kind, an apparatus module can be a dough handling module or a filling dispenser module.

From French patent 2,678,484 is known a production line for food products comprising a plurality of apparatus modules for performing at least one manufacturing stage. A problem with the known arrangement is the heavy structure of the apparatus modules, because all the apparatus modules have a specific driving means, for instance. Therefore, the apparatus modules of the known solution are expensive and technically complicated. Because they are technically complicated, they are also difficult to keep clean and their maintenance is time consuming. The complexity of the apparatus modules also makes product changes slower.

BRIEF DESCRIPTION OF THE INVENTION

The object of the invention is to provide a food industry production line which solves the above problems.

This is achieved with a food industry production line which is characterized in that the production line comprises a frame, that the frame comprises driving means for driving at least one apparatus module, and that at least one movable apparatus module can be adapted to the driving means of the frame such that the apparatus module can be driven by the driving means of the frame.

The preferred embodiments of the invention are disclosed in the dependent claims.

The invention is based on the idea that the frame comprising the driving means for driving at least one apparatus module allows to make the apparatus module simpler. In other words, the frame and the driving means located therein serve as a power source for the apparatus module(s) connected thereto.

An object of the production line according to the invention is to provide a completely modular structure for apparatus modules as well as for a possible modular driving frame to be described below, possible roller modules to be described below and possible floor modules to be described below.

The solution according to the invention enables replacing the apparatus modules by new and different ones and using them to meet the requirements of new products, for instance, when the life cycle of old products is coming to an end. The production line of the invention has an advantage that it enables apparatus modules which are technically simpler, and consequently, cheaper and more user-friendly. This also permits that more apparatus modules of various kinds can be purchased to the production plant, and thus, more product variants can be produced.

Further, the solution of the invention provides an advantage that the apparatus modules are easier to clean and service, because the apparatus modules are technically simpler. Because the apparatus modules are simple and they can be readily arranged product-specifically in different positions on the production line, the production line of the invention is easy to rearrange for manufacturing various food products. Known solutions do not enable free positioning of the apparatus modules in different places.

The solution of the invention also enables free positioning on the production line of different parts of the apparatuses included in one conventional apparatus module. For instance, a rolling machine module need not necessarily be in its entirety in an upstream position on the line, but different parts thereof can be placed in a plurality of separate apparatus modules such that rolling modules and intermediate conveyor modules can be placed throughout the production line. In other words, it is not necessary to roll only one dough to serve as base, but dough having multiple layers, such as laminated dough or puff pastry, can also be produced. The solution of the invention also enables the arrangement of the rolling modules and the possible conveyor modules such that it is possible to manufacture products having three layers of dough and filling between the layers, for instance. The dough layers can also be of different kinds, for instance, rye dough at the bottom, wheat dough in the middle and short crust pastry on the top. This allows easy manufacturing of different kinds of products and also such products that have previously been impossible to produce on these kinds of production lines.

The production lines for food products are often provided with a conveyor system that comprises a conveyor belt. The known production lines for food products have a drawback that it is difficult to change a conveyor belt, such as a perforated conveyor belt for another perforated conveyor belt. The perforated conveyor belts are product-specific. Just to give an example, the perforated conveyor belt intended for manufacturing Karelian pasties cannot be used for manufacturing Danish pastries which require a particular perforated conveyor belt. Hence, it is very important to be able to change the conveyor belt such that the change can be done quickly, easily and hygienically. Therefore, one preferred embodiment of the production line according to the invention comprises an endless conveyor belt that is removable from and remountable onto rollers guiding the conveyor belt without having to disconnect the endless belt.

The conveyor system of the production line according to the invention advantageously comprises means for reeling the conveyor belt into a cassette or the like for storing and transporting the endless belt and for facilitating the mounting thereof. The solution prevents the conveyor belt from coming into contact with the floor when being mounted and/or removed. The solution also facilitates the mounting and/or removal of long and heavy conveyor belts.

In one preferred embodiment of the production line for food products according to the invention, at least one extension piece comprising driving means for driving at least one apparatus module can be arranged in the frame. The extension piece enables implementation of production lines of various lengths. Said extension piece is preferably such that in addition to extending the frame it can also be used for providing a separate, independent production line.

The known solutions have a drawback that the client cannot order a production line, by which products could be first manufactured in a single file and whose capacity could be raised to a desired level later on as the demand and volume increase by adding a selected number of parallel product files in a lateral direction. The solution of the invention enables implementation of production lines of various widths, i.e. production lines comprising a plurality of conveyor belts in parallel, for instance, or permitting the use of conveyor belts and apparatus modules of various widths. The production line according to the invention enables arrangement of apparatus modules of various widths in the frame. This means that by selecting wider apparatus modules, more capacity is achieved in the lateral direction of the production line. Wider apparatus modules, in turn, enable a wider conveyor system, e.g. a wider conveyor belt. Alternatively, it is possible to provide an increase in capacity by positioning a plurality of apparatus modules side by side in the lateral direction of the production line and to combine these operationally such that the apparatus module adjacent to the frame is driven by the driving means in the frame and the next apparatus module is driven by the apparatus module adjacent to the frame. It is apparent to a person skilled in the art that also roller modules to be described below can be arranged side by side in a corresponding manner. Thus, the solution of the invention makes it possible that an economical 'single-file' production line can be started with and production volume can be increased when needed without replacement investment. Said at least one extension piece that can be arranged in the frame of the production line according to the invention can also be such that enables expansion in the production line according to the invention in a corresponding manner in a lateral direction.

One preferred embodiment of the production line according to the invention comprises a floor module, which comprises means for securing the frame to the floor module, means for connecting the floor module with a drainage system and means for securing the floor module to the floor. Including the floor module in the total delivery enables delivery of a fully test-run production system in one package to the production plant of the client.

BRIEF DESCRIPTION OF THE DRAWINGS

In the following, the invention will be described in greater detail in connection with preferred embodiments, with reference to the attached drawings, wherein.

DETAILED DESCRIPTION OF THE INVENTION

Figure 1:
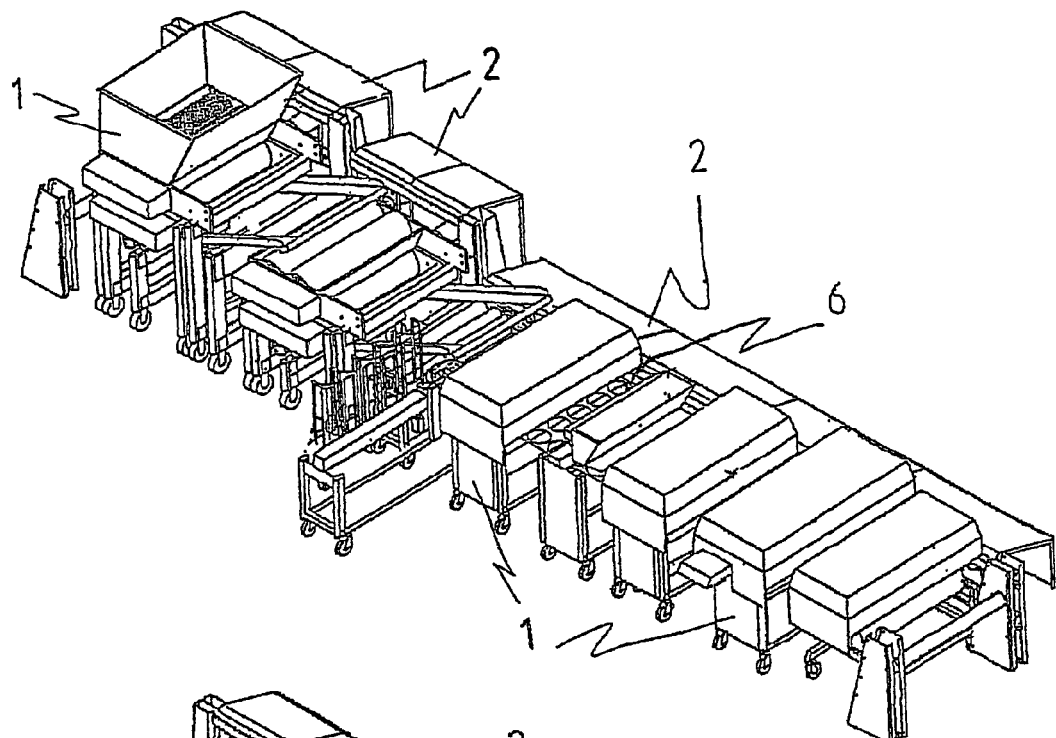
FIG. 1 shows a production line for food products.
Figure 2:
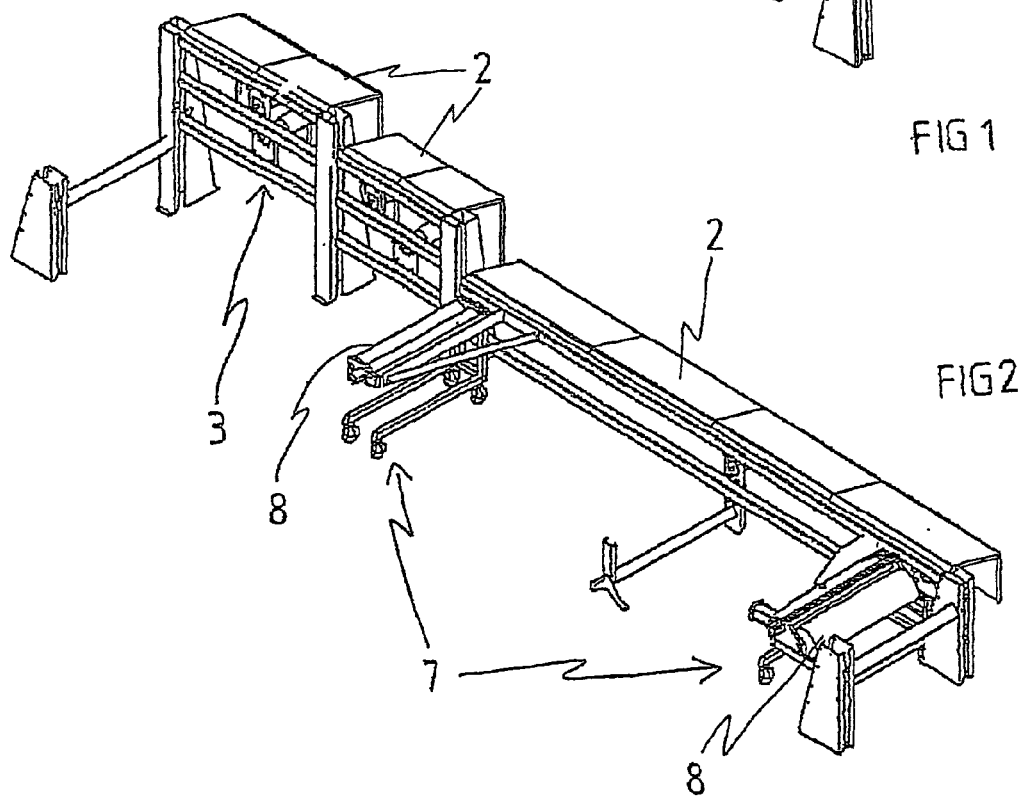
FIG. 2 shows a frame of the production line.

FIG. 1 shows a production line for food products comprising a plurality of movable apparatus modules 1 arranged one after the other each module being arranged to perform at least one manufacturing stage of the food product. The manufacturing stage of the food product can be, for instance, dough rolling, dough moulding or filling dispensing.

The production line of the invention comprises a frame 2. In the figure, the frame 2 is an elongated structure, against which the apparatus modules 1 can be arranged. In the figure, the frame 2 is constructed such that all the apparatus modules 1 are located on the same side of the frame 2. The frame 2 is advantageously made such that production lines of various lengths can be implemented thereby. This means, for instance, that a different number of apparatus modules 1 needed in the manufacture of food products can be arranged to the frame 2.

In the production line of the invention, the frame 2 comprises driving means 3 for driving at least one apparatus module 1. At least one movable apparatus module 1 can be adapted to the driving means 3 of the frame 2 such that the apparatus module 1 can be driven by the driving means 3 of the frame 2. Advantageously, the frame 2 comprises such a number of driving means 3 that each apparatus module 1 needed on the production line can be driven by the driving means 3 of the frame 2.

It is also possible to arrange extension pieces (not shown) in the frame 2 so as to provide production lines of various lengths (long and/or short). This enables detachment of a desired apparatus module 1 with or without the frame 2 and transfer to another place to serve as an independently operating production line. Said extension piece advantageously comprises driving means for driving at least one apparatus module 1.

The driving means 3 are preferably movable with respect to the frame 2 so as to receive various apparatus modules 1 of various sizes, for instance. This means that the driving means 3 are movable in the vertical direction and in the longitudinal direction of the frame 2, for instance.

The frame 2 advantageously comprises an automatic identifying system (not indicated by reference numeral) for the apparatus module 1, which system is arranged to automatically identify the apparatus module 1 adapted to the driving means 3. In this manner, it is possible to identify automatically what kind of an apparatus module 1 is connected to the frame 2, at a particular point of the frame.

Further, the production line for food products according to the invention advantageously comprises a control system (not shown) for controlling the operation of various apparatuses on the production line. Said control system is advantageously connected to said automatic identifying system for the apparatus module 1 such that data on the location of a particular apparatus module are automatically entered in the control system as the apparatus module is put into place on the production line.

The frame 2 advantageously comprises guides 4 for guiding the apparatus module 1 into place with respect to the frame 2. These guides 4 are advantageously arranged to guide the apparatus module 1 such that, at the same time, the apparatus module 1 is guided to a right place with respect to the driving means 3 so as to engage therewith. Advantageously, these guides 4 can also be arranged to keep the apparatus modules 1 in place with respect to the frame 2.

The frame 2 advantageously comprises movable locking means (not indicated by reference numeral) for locking the apparatus module 1 into place with respect to the frame 2. The locking means preferably operate automatically such that they automatically lock the apparatus module 1 into place in the frame 2 at least when the production line is in operation or when the apparatus module 1 is mounted with respect to the frame 2.

In the figures, the apparatus modules 1 advantageously comprise wheels 5 for moving the apparatus modules. Alternatively, the apparatus modules 1 can be provided with some other means for moving them.

The production line shown in the figures also comprises a conveyor system (not indicated by reference numeral), which comprises a perforated conveyor belt 6 for conveying semi-finished and/or finished food products to be shaped (not shown) on the production line. Alternatively, the semi-finished and/or finished food products can be conveyed on the production line in some other manner, for instance, on inclined surfaces (not shown) or transferable plates (not shown).

The conveyor belt 6 is advantageously but not necessarily an endless belt as shown in the figures.

Figure 4:
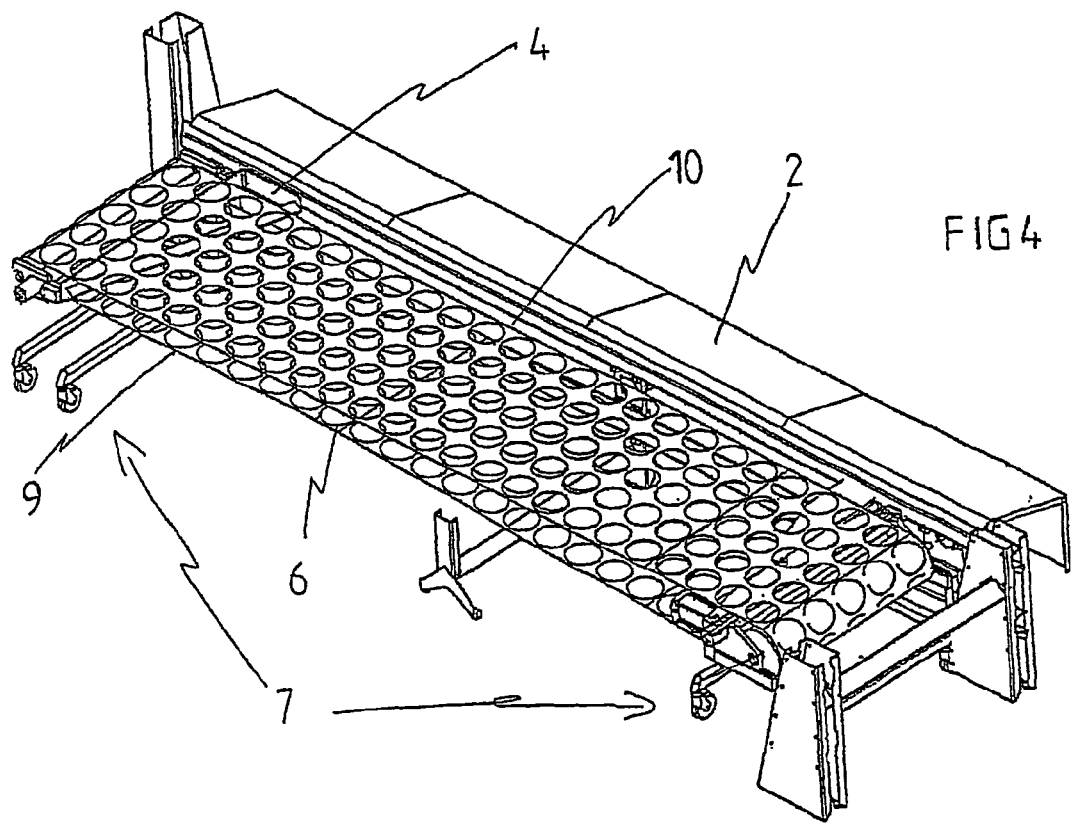
FIG. 4 shows a conveyor system.
Figure 5:
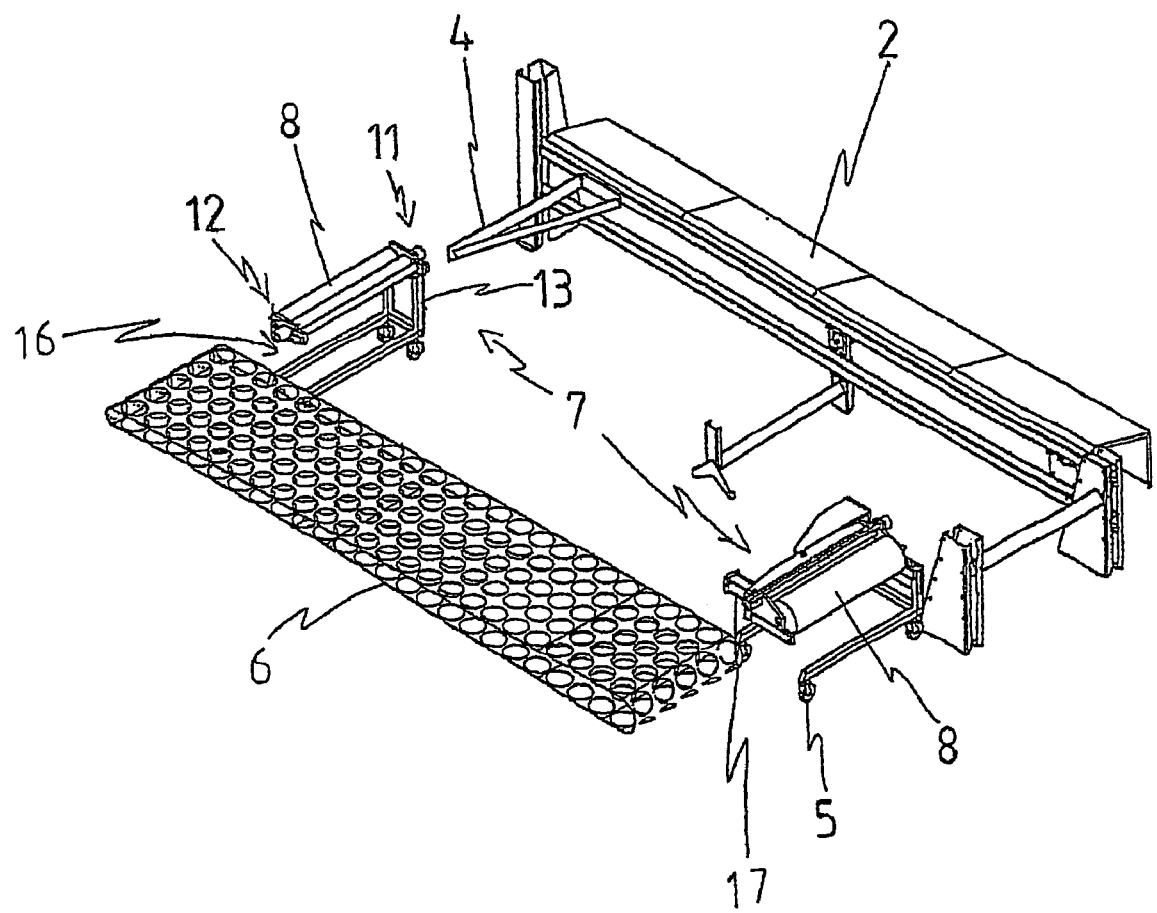
FIG. 5 shows the conveyor system of FIG. 4 in a state, where a conveyor belt is detached from rollers and roller modules are detached from the frame.

The conveyor system shown in the figures comprises a first side 9 on one side of the endless belt 6 and a second side 10 on the opposite side of the endless belt 6. The conveyor system shown in FIGS. 4 and 5 comprises two rollers 8 for guiding the endless belt 6 on the production line. In FIGS. 4 and 5, the rollers 8 are secured in the conveyor system only on the second side 10 of the conveyor system and the endless belt 6 is detachably mounted on the rollers 8 such that the endless belt 6 can be removed from the rollers 8 and remounted onto the rollers 8 from the first side 9 of the conveyor system without having to disconnect the endless belt 6.

In FIGS. 4 and 5, the endless belt 6 can be removed from the conveyor system, for instance, by pulling the endless belt 6 at least partly in the direction of the rotation axis (not shown) of the rollers 8. In other words, the endless belt 6 is removable from the rollers 8 from the first side 9 of the conveyor system, for instance, by pulling the endless belt 6 from the rollers 8 in a direction that is substantially transversal to the travel direction (not indicated by reference numeral) of the conveyor belt 6. The endless conveyor belt 6 is remountable in a corresponding manner onto the rollers 8 from the first side 9 of the conveyor system without having to disconnect the endless conveyor belt 6.

The conveyor system of the production line shown in the figures can be easily rendered to a state, in which the endless belt 6 is easily removable from the rollers 8 from the first side 9 of the conveyor system. The situation in FIG. 4 is achieved by moving the movable apparatus modules aside such that the endless belt 6 is substantially fully exposed.

Figure 3:
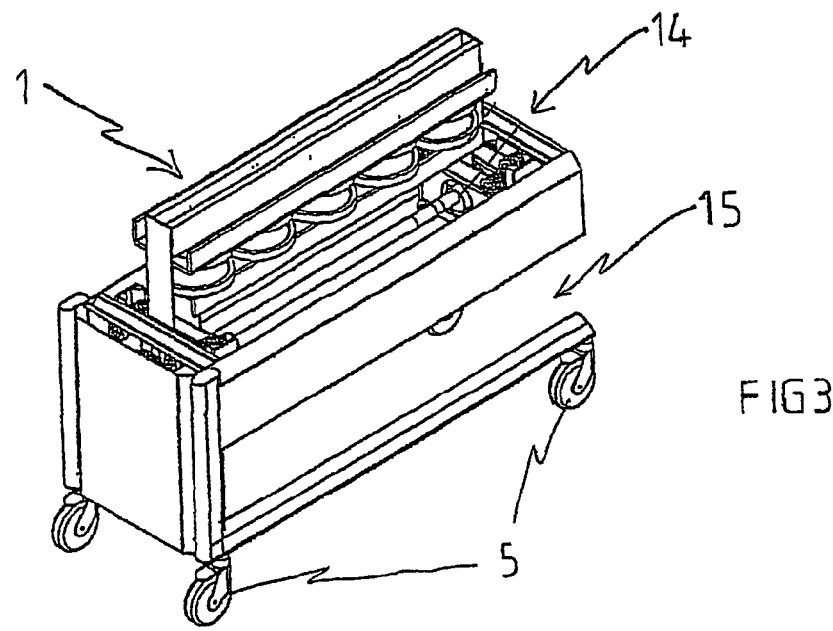
FIG. 3 shows one apparatus module.

The apparatus modules 1 shown in the figures are designed such that the apparatus modules 1 can be arranged in and transferred from the conveyor system the conveyor belt 6 being mounted in the conveyor system. The apparatus module 1 of FIG. 3 is designed to comprise a first recess 14 extending from an end (not indicated by reference numeral) of the apparatus module 1, and therebeneath a second recess 15 for the conveyor belt 3. The apparatus module 1 of FIG. 3 can thus be pushed against the frame 2 as the conveyor belt 6 is mounted in the conveyor system in such a manner that the upper portion (not indicated by reference numeral) of the conveyor belt 6 occupies the first recess 14 and the lower portion (not indicated by reference numeral) of the conveyor belt 6 occupies the second recess 15. In the apparatus module 1 of FIG. 3 the second recess 15 is completely beneath the production devices (not indicated by reference numerals) of the apparatus module 1 and the first recess 14 goes through said production devices of the apparatus module 1. In other words, the first recess 14 forms a gap of the same width as the conveyor belt 6 in the apparatus module 1, in which the conveyor belt 6 is arranged to travel.

In FIG. 5, the rollers 8 are supported in the roller modules 7 only in the vicinity of the second end 11 of the rollers 8 such that a vertical support 13 is located only at the second end 11 of the roller 8. The roller 8 is secured substantially at the upper end of the vertical support 13. The first end 12 of the roller 8 is not supported with a similar vertical support 13. Hence, a recess 16, which extends beneath the roller 8 from the first end 12 of the roller module 7 up to the vertical support 13 is formed in the roller module 7. Thus, suspension as shown in FIG. 5 enables that the endless conveyor belt 6 is pushed, i.e. mounted onto the roller from the first end 12 of the roller 8, i.e. from the first side 9 of the conveyor system without having to disconnect the endless conveyor belt 6.

Advantageously, the conveyor system is adjustable such that conveyor belts 6 of various sizes and qualities can be employed therein. In the figures, adjustment is implemented such that the rollers 8 are arranged in the roller modules 7 whose positioning with respect to one another is adjustable.

Use of the roller modules 7 also allows that by positioning the roller modules 7 at desired places on the production line, the semi-finished and/or finished food products can be conveyed on the conveyor belt 6 from one selected point to another. For instance, the semi-finished food products can be conveyed on the conveyor belt 6 from the desired point via particular apparatus modules 1, and the semi-finished or finished food products can be delivered from the conveyor belt 6 at a desired point.

It is also possible that the conveyor system comprises more that two rollers 8 or roller modules 7 provided with a roller 8, and the desired conveyor system 2 can be achieved by mounting the conveyor belt 6 on selected rollers 8.

It is possible that the production line for food products according to the invention comprises more than one conveyor systems, for instance two conveyor belts 6.

The roller modules 7 are preferably movable with respect to the frame 2 such that the conveyor belt 6 can be driven by the driving means 3 in the frame 2. The driving means 3 are preferably movable with respect to the frame 2 so as to receive various roller modules 7.

The frame 2 advantageously comprises an automatic roller module identifying system (not shown) arranged in connection with the driving means, which system is arranged to automatically identify the roller module 7 adapted to the driving means 3. Advantageously, the roller module identifying system is the same system as the one arranged to identify the apparatus module 1 adapted to the driving means 3, if the production line is provided with this kind of identifying system for the apparatus module 1.

Said guides 4 for guiding the apparatus modules 1 into place with respect to the frame 2 is advantageously also arranged to guide the roller module 7 to a point where it will automatically be connected with the driving means 3 in the frame 2.

The frame 2 advantageously comprises movable locking means (not indicated by reference numeral) for locking at least one roller module 7 into place with respect to the frame 2. The locking means preferably operate automatically such that they automatically lock the roller module 7 into place in the frame 2 at least when the production line is in operation or when the roller module 7 is mounted with respect to the frame 2.

The roller modules 7 shown in the figures advantageously comprise wheels 5 for moving the modules 7. Alternatively, the roller modules 7 can be provided with some other means for moving them.

In the figures, the conveyor system 2 comprises means 17 for tightening the endless belt 6. The means 17 can also be arranged to prevent the endless belt 6 from loosening when the production line is in use. The means 17 for tightening the belt 6 shown in FIG. 5 comprise a pneumatic cylinder (not indicated by reference numeral).

The conveyor system 2 preferably comprises means for reeling the conveyor belt 6 into a cassette (not shown) or the like for storing or transporting the conveyor belt 6 and for facilitating the mounting thereof. The solution prevents the conveyor belt from coming into contact with the floor when being mounted and/or removed. The solution also facilitates the mounting and/or removal of long and heavy conveyor belts 6.

The conveyor belt 6 can also be arranged to shape a semi-finished food product or to carry out another manufacturing stage of the food product. FIGS. 4 and 5 show conveyor belts 6, which are provided with openings (not indicated by reference numerals) for conveying moulds (not shown).

The production line for food products according to the invention advantageously also comprises a floor module (not shown), which comprises means (not shown) for securing the frame 2 to the floor module, means (not shown) for connecting the floor module with a drainage system and means not shown) for securing the floor module to the floor.

It is obvious to the person skilled in the art that as technology progresses the basic idea of the invention can be implemented in a variety of ways. The invention and its embodiments are thus not restricted to the above-described examples, but they may vary within the scope of the claims.

The invention claimed is:

1. A production line for food products comprising:
a plurality of apparatus modules arranged one after the other, each module being adapted to perform at least one manufacturing stage of the food product,
wherein the production line comprises a frame,
wherein the frame comprises driving means for driving at least one apparatus module,
wherein at least one movable apparatus module can be adapted to the driving means in the frame such that the apparatus module can be driven by the driving means in the frame,
wherein the apparatus module is configured to perform at least one food product manufacturing stage, and
wherein the driving means serves as a power source for the apparatus module.

2. A production line as claimed in claim 1, wherein the driving means are movable with respect to the frame so as to receive various apparatus modules.

3. A production line as claimed in claim 1, wherein the frame comprises guides for guiding the apparatus module into place with respect to the frame.

4. A production line as claimed in claim 1, wherein the apparatus module comprises means for moving the modules.

5. A production line as claimed in claim 4, wherein the means for moving the modules comprise wheels.

6. A production line as claimed in claim 1, further comprising a conveyor belt for conveying semi-finished and/or finished food products on the production line.

7. A production line as claimed in claim 6, wherein the conveyor system is adjustable such that conveyor belts of various sizes and qualities can be employed therein.

8. A production line as claimed in claim 6, wherein the conveyor belt can be driven by the driving means in the frame.

9. A production line as claimed in claim 6, further comprising means for tightening the conveyor belt.

10. A production line as claimed in claim 1, wherein the food product manufacturing stage is at least one of dough rolling, dough moulding, and filling dispensing.

11. A production line for food products comprising:
a plurality of apparatus modules arranged one after the other, each module being adapted to perform at least one manufacturing stage of the food product,
wherein the production line comprises a frame,
wherein the frame comprises driving means for driving at least one apparatus module, and
wherein at least one movable apparatus module can be adapted to the driving means in the frame such that the apparatus module can be driven by the driving means in the frame,
a conveyor belt for conveying semi-finished and/or finished food products on the production line
wherein the conveyor belt is an endless conveyor belt,
wherein a conveyor system comprises a first side on one side of the conveyor belt and a second side on the other, opposite side of the endless conveyor belt,
wherein the production line comprises at least two rollers for guiding the endless conveyor belt on the production line,
wherein the rollers are secured in the conveyor system only on the second side of the conveyor system, and wherein the endless conveyor belt is detachably mounted on the rollers such that the endless belt can be removed from the rollers and remounted onto the rollers from the first side of the conveyor system without having to disconnect the endless belt.

12. A production line as claimed in claim 11, wherein the rollers are arranged in movable roller modules.

13. A production line as claimed in claim 11,
wherein the conveyor belt can be driven by the driving means in the frame,
wherein the rollers are arranged in movable roller modules, and
wherein the driving means can be moved with respect to the frame so as to receive various roller modules.

14. A production line as claimed in claim 11,
wherein the conveyor belt can be driven by the driving means in the frame, and
wherein the rollers are arranged in movable roller modules.

15. A production line as claimed in claim 11,
wherein the rollers are arranged in movable roller modules, and
wherein the frame comprises guides for guiding the roller module into place with respect to the frame.

16. A production line as claimed in claim 11,
wherein the rollers are arranged in movable roller modules, and
wherein the roller module comprises means for moving the modules.

17. A production line as claimed in claim 16, wherein the means for moving the modules comprise wheels.

18. A production line as claimed in claim 11,
wherein the rollers are arranged in movable roller modules, and
wherein the movable roller modules can be moved with respect to the frame such that the conveyor belt can be driven by the driving means in the frame.

19. A production line as claimed in claim 11, further comprising means for reeling the conveyor belt into a container.

20. A production line as claimed in claim 19, wherein the container is a cassette.

* * * * *